United States Patent
Fick (10) Patent No.: US 7,897,046 B2
(45) Date of Patent: Mar. 1, 2011

(54) FLUID FILTER

(75) Inventor: Walter J. Fick, Kearney, NE (US)

(73) Assignee: Baldwin Filters, Inc., Kearney, NE (US)

(*) Notice: Subject to any disclaimer, the term of this patent is extended or adjusted under 35 U.S.C. 154(b) by 1378 days.

(21) Appl. No.: 11/340,443

(22) Filed: Jan. 25, 2006

(65) Prior Publication Data

US 2007/0170103 A1     Jul. 26, 2007

(51) Int. Cl.
*B01D 27/00* (2006.01)
*B01D 27/08* (2006.01)

(52) U.S. Cl. .................. 210/232; 210/450; 210/493.3

(58) Field of Classification Search ............... 210/232, 210/450, 493.3
See application file for complete search history.

(56) References Cited

U.S. PATENT DOCUMENTS

| | | |
|---|---|---|
| 2,533,266 A | 12/1950 | Kovacs et al. |
| 2,693,281 A | 11/1954 | Winzen |
| 3,000,506 A | 9/1961 | Hultgren |
| 3,054,507 A | 9/1962 | Humbert, Jr. et al. |
| 3,224,583 A | 12/1965 | Rosaen |
| 3,288,291 A | 11/1966 | Rosaen |
| 3,295,680 A | 1/1967 | Wilber |
| 3,333,703 A | 8/1967 | Scavuzzo et al. |
| 3,397,786 A | 8/1968 | Hultgren |
| 3,457,339 A | 7/1969 | Pall et al. |
| 3,486,622 A * | 12/1969 | Rosaen et al. ........... 210/90 |
| 3,561,604 A | 2/1971 | Yotsumoto |
| 3,807,561 A | 4/1974 | Cullis |
| 4,108,775 A | 8/1978 | Wilkes et al. |
| 4,133,763 A * | 1/1979 | Cooper .................. 210/232 |
| 4,521,309 A | 6/1985 | Pall |
| 4,536,291 A | 8/1985 | Hoffmann et al. |
| 4,755,289 A | 7/1988 | Villani |
| 4,906,365 A | 3/1990 | Baumann et al. |
| 4,948,503 A | 8/1990 | Baumann et al. |
| 4,956,089 A | 9/1990 | Hurst |
| 5,045,192 A | 9/1991 | Terhune |
| 5,066,391 A | 11/1991 | Faria |
| 5,085,769 A | 2/1992 | Klausen et al. |
| 5,211,846 A | 5/1993 | Kott et al. |
| 5,250,179 A | 10/1993 | Spearman |
| 5,374,355 A | 12/1994 | Habiger et al. |

(Continued)

FOREIGN PATENT DOCUMENTS

DE     2145708 A     3/1972

(Continued)

OTHER PUBLICATIONS

Photograph of Fleetguard Filter Element, available approximately on Jan. 30, 2004, one page.

(Continued)

*Primary Examiner* — Thomas M Lithgow
(74) *Attorney, Agent, or Firm* — Leydig, Voit & Mayer, Ltd.

(57) ABSTRACT

The invention comprises a fluid filter for separating contaminants from a liquid. The filter comprises a cylindrical body, a retainer, and a ring. The cylindrical body comprises an aperture disposed therethrough, a filter material for filtering the contaminants from the liquid, and an end cap portion. The retainer is coupled to the end cap portion, and the ring is disposed at least partially between the end cap portion and the retainer. A method for constructing such a filter is also disclosed.

29 Claims, 14 Drawing Sheets

U.S. PATENT DOCUMENTS

| | | |
|---|---|---|
| 5,468,386 A | 11/1995 | Ardes |
| 5,538,626 A | 7/1996 | Baumann |
| 5,660,726 A | 8/1997 | Dluzik |
| 5,660,729 A | 8/1997 | Baumann |
| 5,718,825 A | 2/1998 | Greive et al. |
| 5,770,054 A | 6/1998 | Ardes |
| 6,016,923 A | 1/2000 | Baumann |
| 6,086,763 A | 7/2000 | Baumann |
| 6,090,283 A | 7/2000 | Schumann et al. |
| 6,554,139 B1 | 4/2003 | Maxwell et al. |
| 6,569,326 B1 | 5/2003 | Baumann et al. |
| 6,579,448 B2 | 6/2003 | Dworatzek |
| 6,685,829 B1 | 2/2004 | Baumann et al. |
| 6,696,671 B2 | 2/2004 | Boehnke |
| 6,921,479 B2 | 7/2005 | Ardes |
| 6,926,825 B2 | 8/2005 | Ardes |
| RE38,917 E | 12/2005 | Ardes |
| 7,029,575 B1 | 4/2006 | Baumann et al. |
| 7,066,726 B2 | 6/2006 | Boehnke |
| 2003/0173053 A1 | 9/2003 | Boehnke |

FOREIGN PATENT DOCUMENTS

| | | |
|---|---|---|
| DE | 2815993 A1 | 10/1979 |
| DE | 3422482 A1 | 12/1985 |
| DE | 3538589 C2 | 12/1987 |
| DE | 3904701 A1 | 8/1990 |
| DE | 3903675 C2 | 9/1991 |
| DE | 4325997 C1 * | 9/1994 |
| DE | 4214500 C2 | 5/1996 |
| EP | 375373 A2 * | 6/1990 |
| FR | 1177350 | 4/1959 |
| GB | 526736 | 9/1940 |
| GB | 2163368 A | 2/1986 |
| GB | 2226254 | 6/1990 |
| WO | WO 01/19491 A1 | 3/2001 |
| WO | WO 01/85304 A1 | 11/2001 |

OTHER PUBLICATIONS

Photographs of Hengst Filter Element, available approximately on Jan. 30, 2004, two pages.

Photograph of Hengst Filter Element, available approximately on Jan. 30, 2004, one page.

Photograph of John Deere Filter Element, available approximately on May 6, 2002, one page.

Photographs of Mann Filter Element, available approximately on Jan. 30, 2004, two pages.

* cited by examiner

FLUID FILTER

FIELD OF THE INVENTION

The invention pertains to filters for removing contaminants from a fluid, and more particularly, filters for removing contaminants from fuel or oil.

BACKGROUND OF THE INVENTION

Filters for removing contaminants from fluids, including fuels and oil, are known in the art. These types of filters are needed because fuels and oils often contain impurities, such as solid particles, that can damage an engine if not filtered out of the fuel or oil line before reaching the engine. Often, the filter will be disposed within a housing and will be constructed of an appropriate filtering material disposed between a fuel input and a fuel output of the housing. In some applications, the filter is often permanently disposed within a housing and discarded with the housing as a single unit.

In other applications, however, the housing is fixed to the vehicle and the filter may be removed therefrom. With removable filters, typically, these filters are disposed upright with the output being disposed near the bottom of the filter. Thus, it is possible that contaminants collect near the bottom of the housing and filter. The contaminants migrate to the bottom of the housing due to gravity during periods of normal use and particularly during intermittent usage, such as engine shutdown periods. Also, contaminants adhere to the housing wall and are captured by the filtering media. During intermittent usage and particularly when the filter is removed, these contaminants can become dislodged and migrate to the bottom of the housing. When the filter is removed, the contaminants may flow to a drain, and after the filter is replaced, the contaminants may return to the input. Thus, contaminants may be continuously recycled out of and back into the filter housing if a structure is not provided to prevent these contaminants from exiting through the base of the housing.

Current filters of this type have attempted to remedy these issues by applying a foam material, or other contaminant capturing features, around the circumference and near the lower end cap of the filter. The way in which this foam material has been applied in current filters, however, is undesirable in that an adhesive is used to retain the foam against the filter body. An adhesive that is misapplied, non-uniformly applied around the circumference of the filter, and/or an adhesive that fails due to heat, pressure, or other reason can result in the continual cycling of already filtered contaminates back through the housing. Other quality issues persist, such as inconsistent positioning or leakage through pleats (for current filters that dispose the foam material on the filter pleats). Furthermore, adhesives can be expensive and require additional expensive labor and/or processes to apply. Similarly, other contaminant capturing features are expensive from a material, tooling, and/or process standpoint. They are subject to similar quality concerns also. Thus, there is a need for a filter that addresses these shortcomings of current filters.

BRIEF SUMMARY OF THE INVENTION

The invention provides a fluid filter for separating contaminants from a liquid, the filter comprising a cylindrical body, a retainer, and a ring. The cylindrical body comprises an aperture disposed therethrough, a filter material for filtering the contaminants from the liquid, and an end cap portion. The retainer is coupled to the end cap portion, and a ring is disposed at least partially between the end cap portion and the retainer.

The invention also provides a fluid filter for separating contaminants from a liquid and being adapted to be disposed within a housing having an inner surface. The filter comprises a cylindrical body and a ring. The cylindrical body comprises an aperture disposed therethrough and a filter material for filtering the contaminants from the liquid. The ring is for disposal against the inner surface of the housing and is coupled to the cylindrical body without the use of an adhesive.

The invention further provides a method of manufacturing a filter for separating contaminants from a liquid. The method comprises attaching a filter material to an end cap, disposing a ring near the end cap, the ring having an outer diameter greater than an outer diameter of the end cap, and retaining the ring near the end cap without the use of an adhesive.

DETAILED DESCRIPTION OF THE INVENTION

Figure 1:
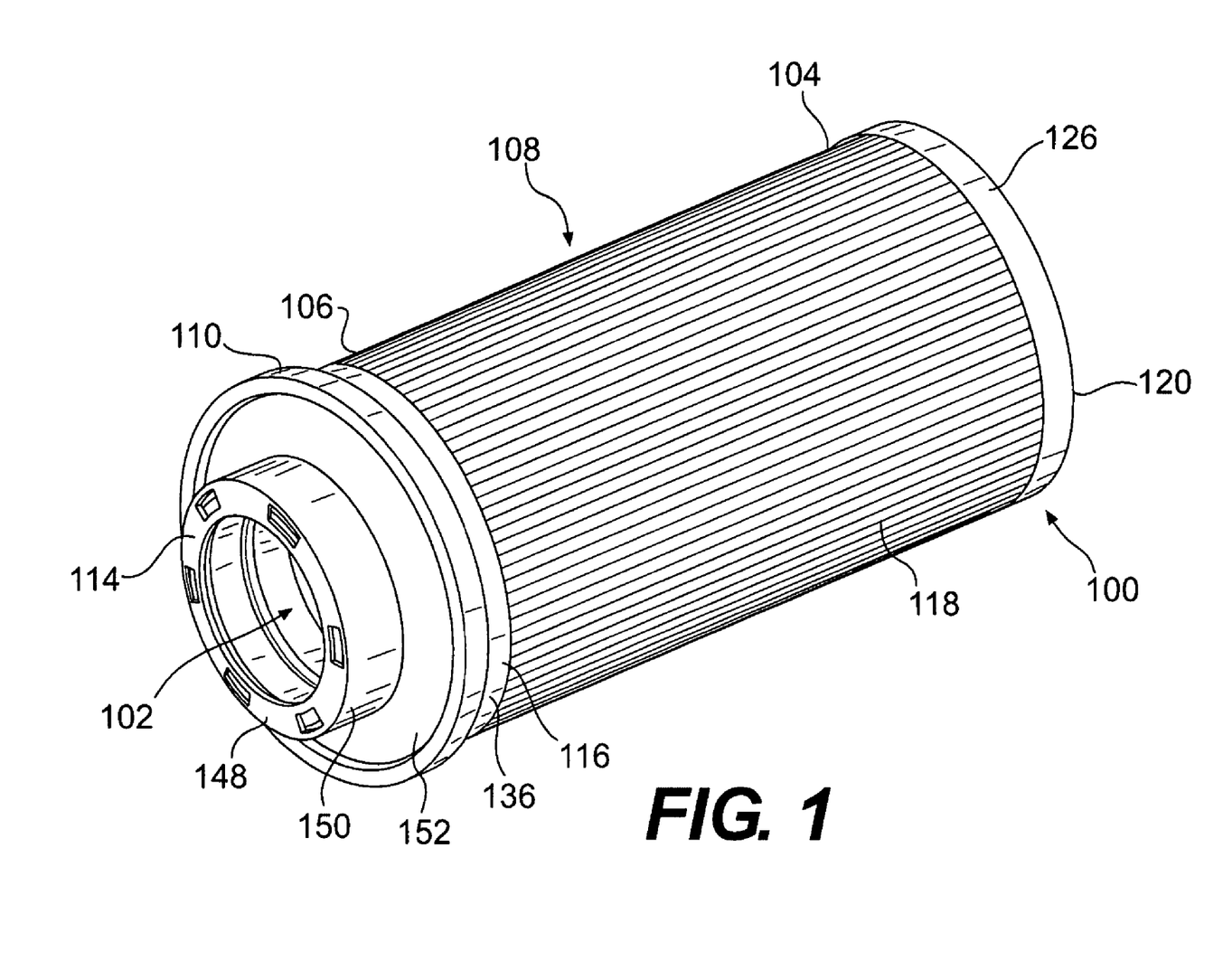
FIG. 1 is a perspective view of a fluid filter.

Turning to the figures, there is shown in FIG. 1 a fluid filter 100 for separating contaminants from a fluid, such as fuel or oil. The filter 100 has a structure that permits a fluid to pass through the filter 100 from an input to an output such that contaminants contained in the input fluid are prevented from entering the output. In this way, potentially damaging particles are prevented from reaching, for example, the engine of a vehicle.

As shown in FIGS. 1-4, the filter 100 is cylindrical in shape with an aperture 102 disposed therethrough. The filter 100 has an upper portion 104 and a lower portion 106. The filter 100 may comprise a body 108, a ring 110, a gasket 112, and a retainer 114. The ring 110, gasket 112, and retainer 114 are disposed near the lower portion 106 such that the ring 110 is disposed substantially between the body 108 and the retainer 114.

Figure 3:
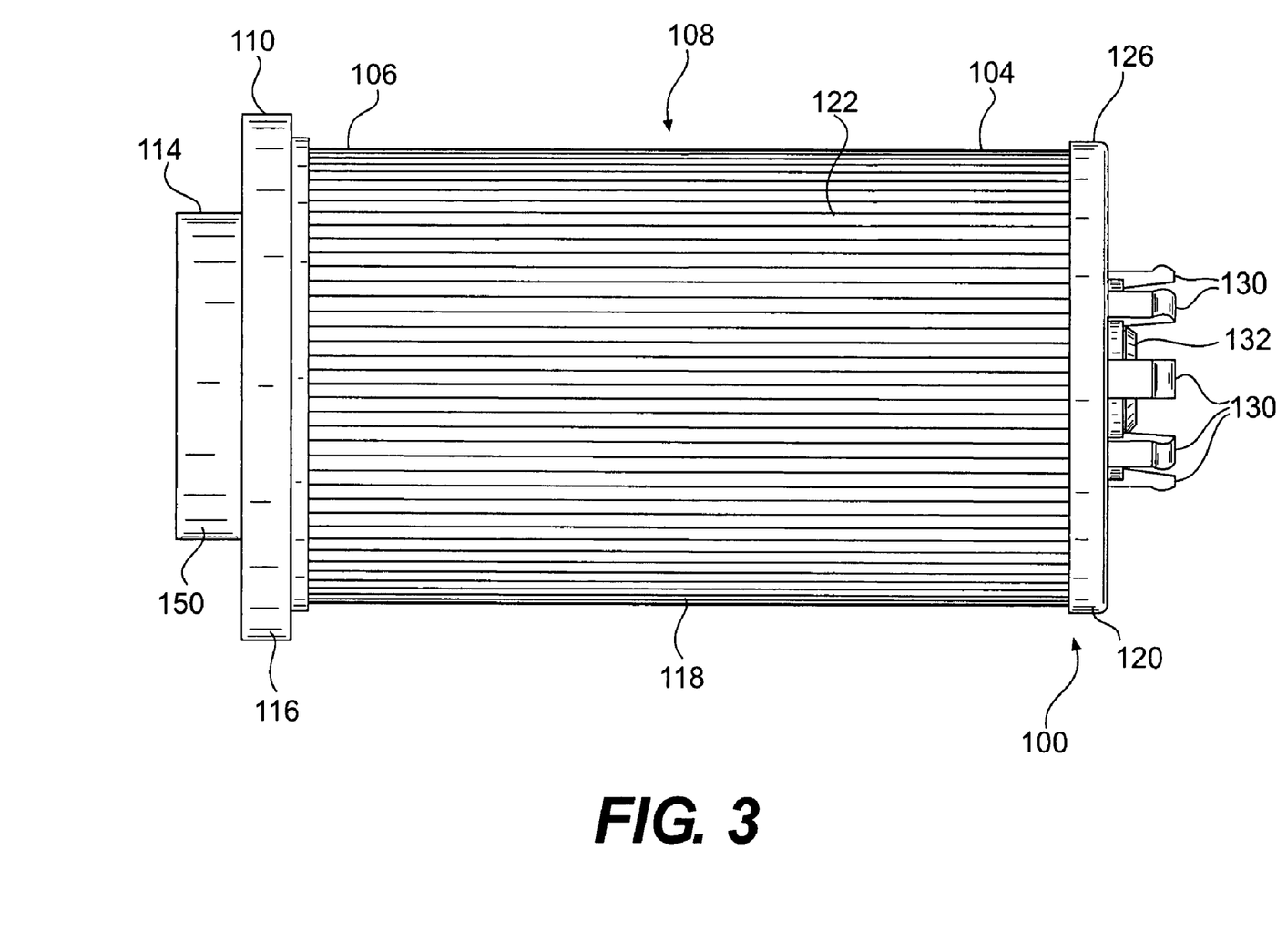
FIG. 3 is a side view of the fluid filter of FIG. 1.
Figure 5:
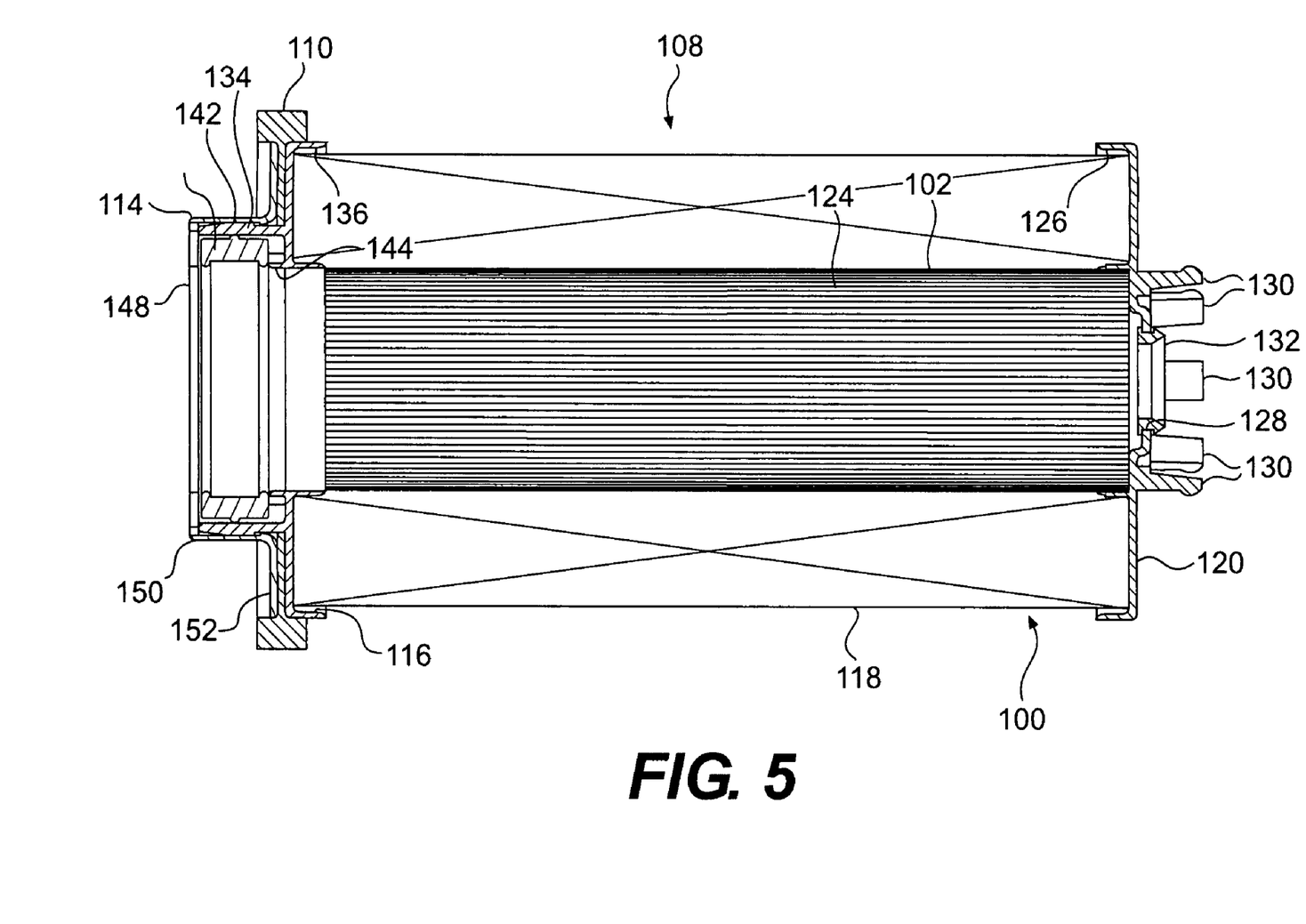
FIG. 5 is a cross-sectional view taken along line 5-5 shown in FIG. 4 of the fluid filter of FIG. 1.

Turning to FIGS. 3 and 5, the body 108 may comprise a lower end cap 116, a filter portion 118, and an upper end cap 120. The filter portion 118 comprises an accordion structure formed as a cylinder. The accordion structure has external folds 122 and internal folds 124. Given the cylindrical shape, the distance between consecutive outer folds 122 is larger than the distance between consecutive inner folds 124. This arrangement creates an outer surface of the filter portion that has a more openly exposed surface area to trap contaminants from fluids entering the filter portion from the outer surface. The filter portion 118 is constructed of a porous material suitable for the transfer of fluids from one side of the filter portion 118 to the other side of the filter portion 118 while preventing the passage of contaminants of a particular size. The filter material is often a paper or woven material, however, it will be appreciated that any suitable material may be used.

Figure 4:
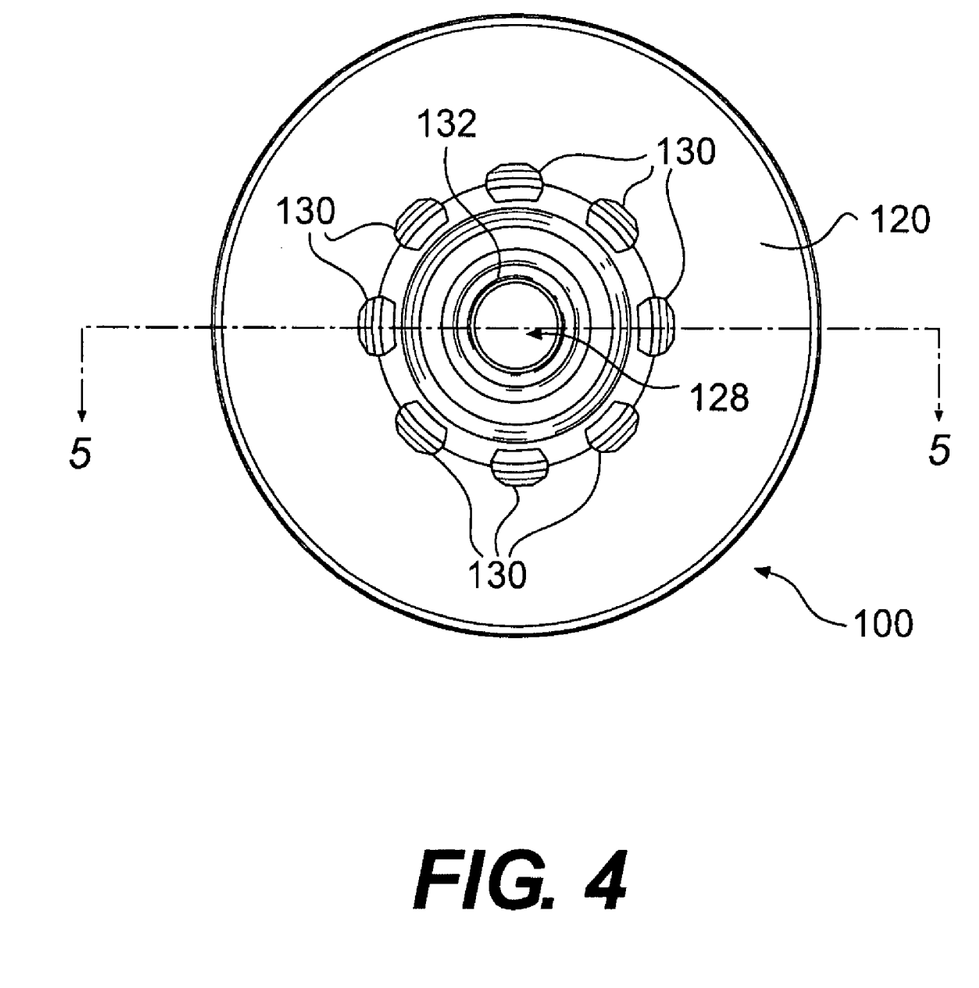
FIG. 4 is a top plan view of the fluid filter of FIG. 1.

As shown in FIGS. 4 and 5, the upper end cap 120 is generally cylindrical and comprises a filter material receiving portion 126. The filter material receiving portion 126 is adapted to be coupled to the filter portion 118 via any suitable manner. The upper end cap may include an aperture 128. This aperture 128 may comprise a seal 132, both of which are described in further detail below. The upper end cap 120 may also include structures for attaching it to the housing cap 160 (described below). One example of suitable structures are one or more prongs 130. The functions of the aperture 128, seal 132, or structure for attaching the filter 100 to the housing cap 160 may also be accomplished using other features, such as adapters that provide the same functions.

Figure 2:
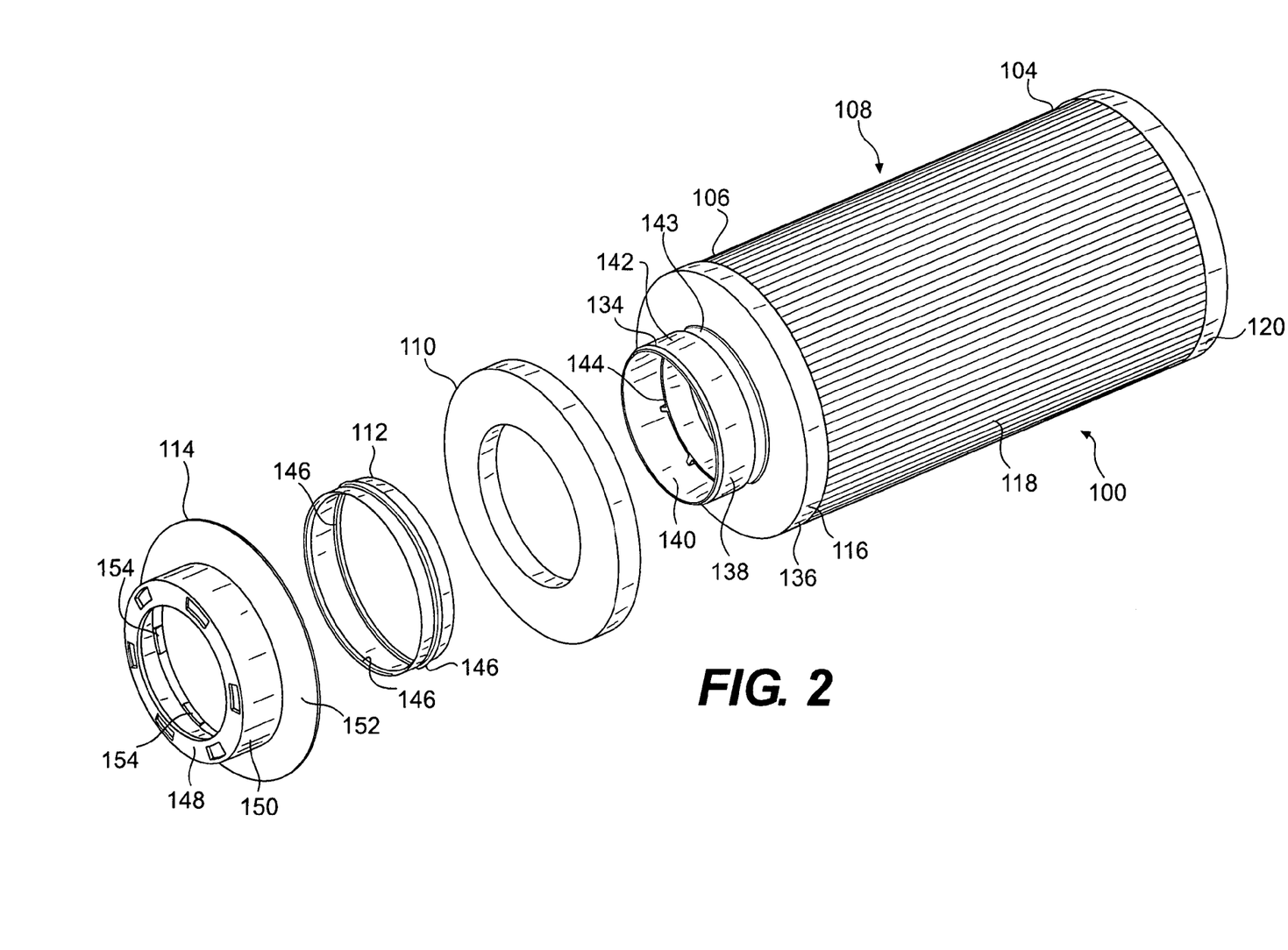
FIG. 2 is an exploded view of the fluid filter of FIG. 1.
Figure 6:
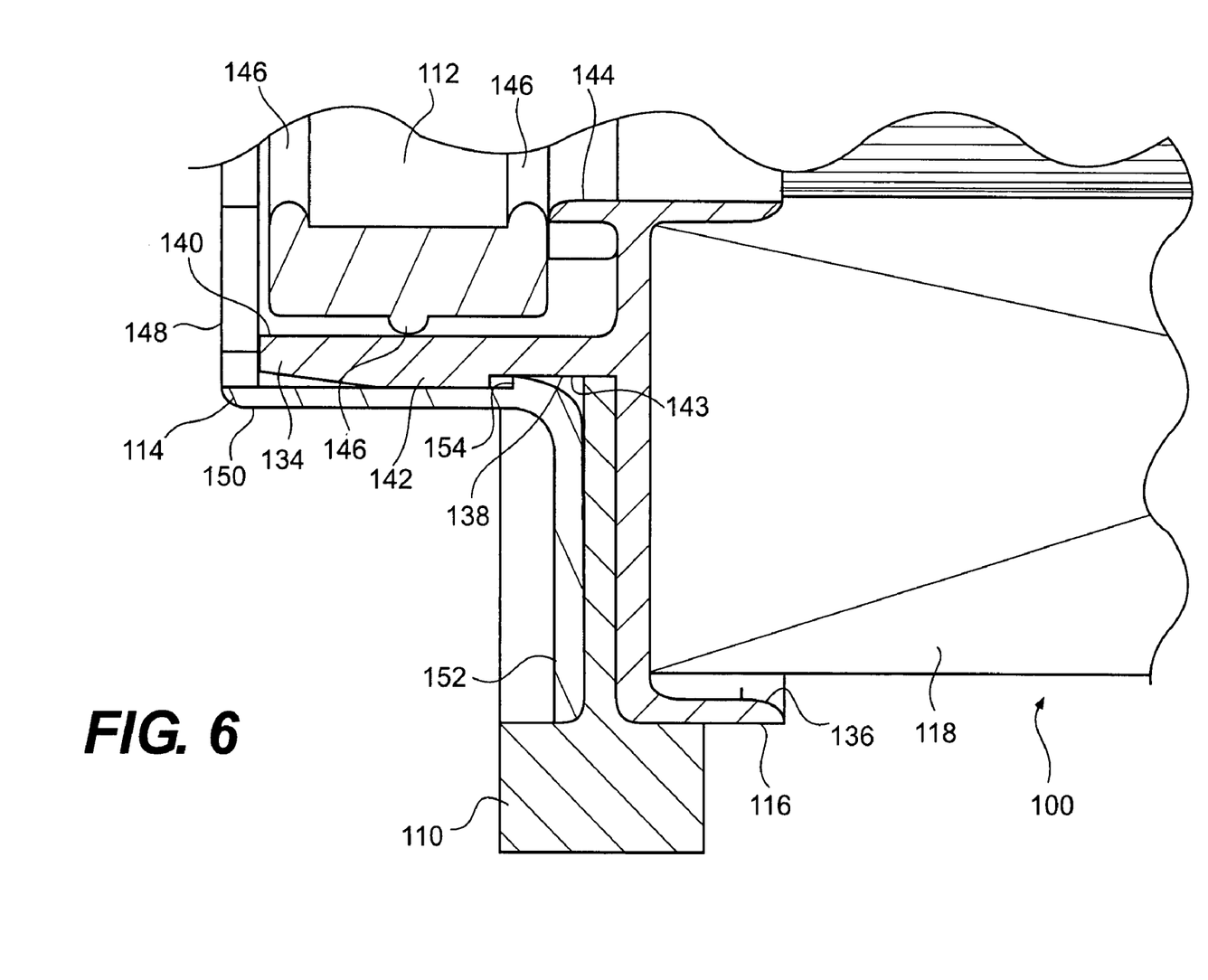
FIG. 6 is an enlarged fragmentary cross-sectional view of the fluid filter of FIG. 1.
Figure 10:
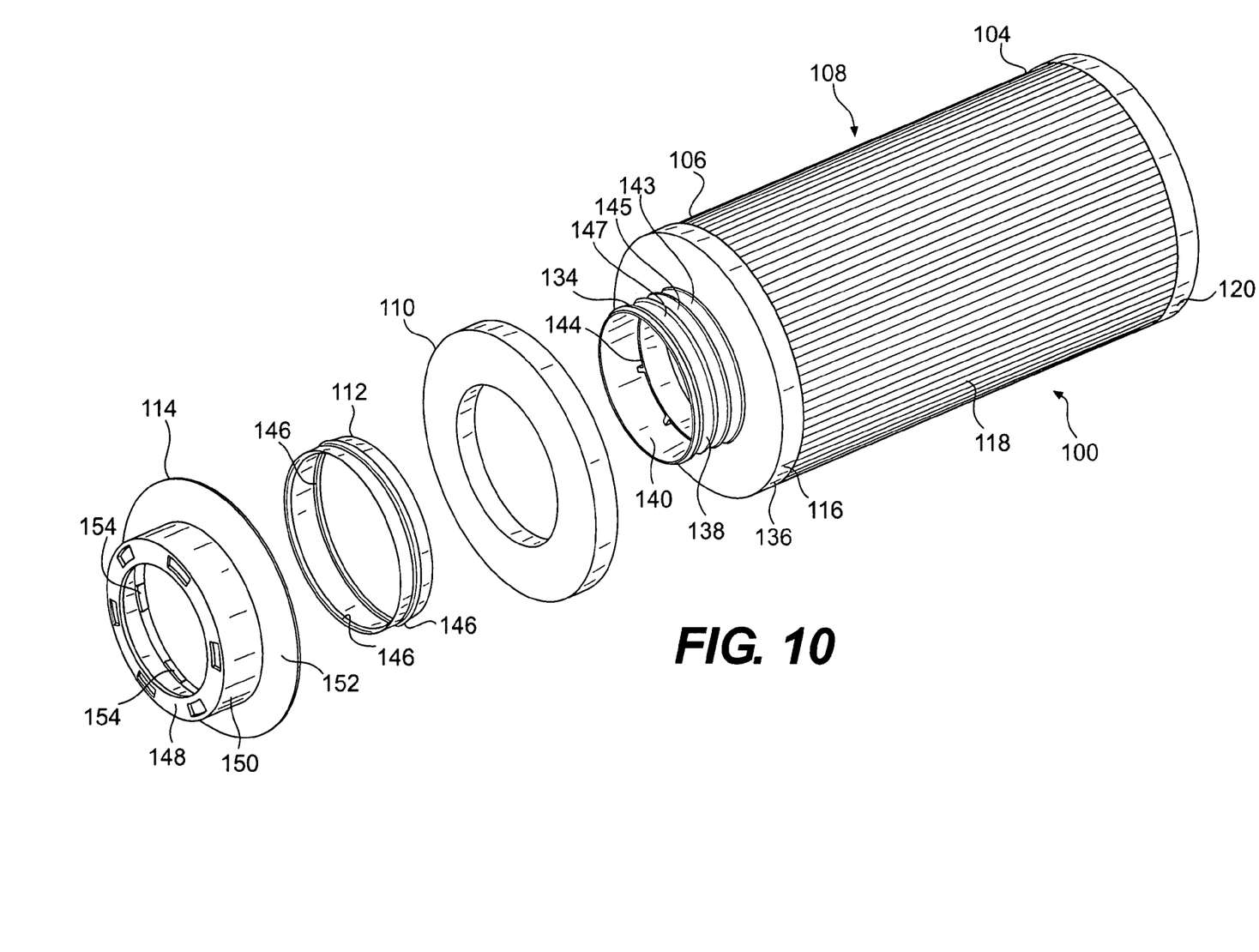
FIG. 10 is an exploded view showing another embodiment of a fluid filter.
Figure 11:
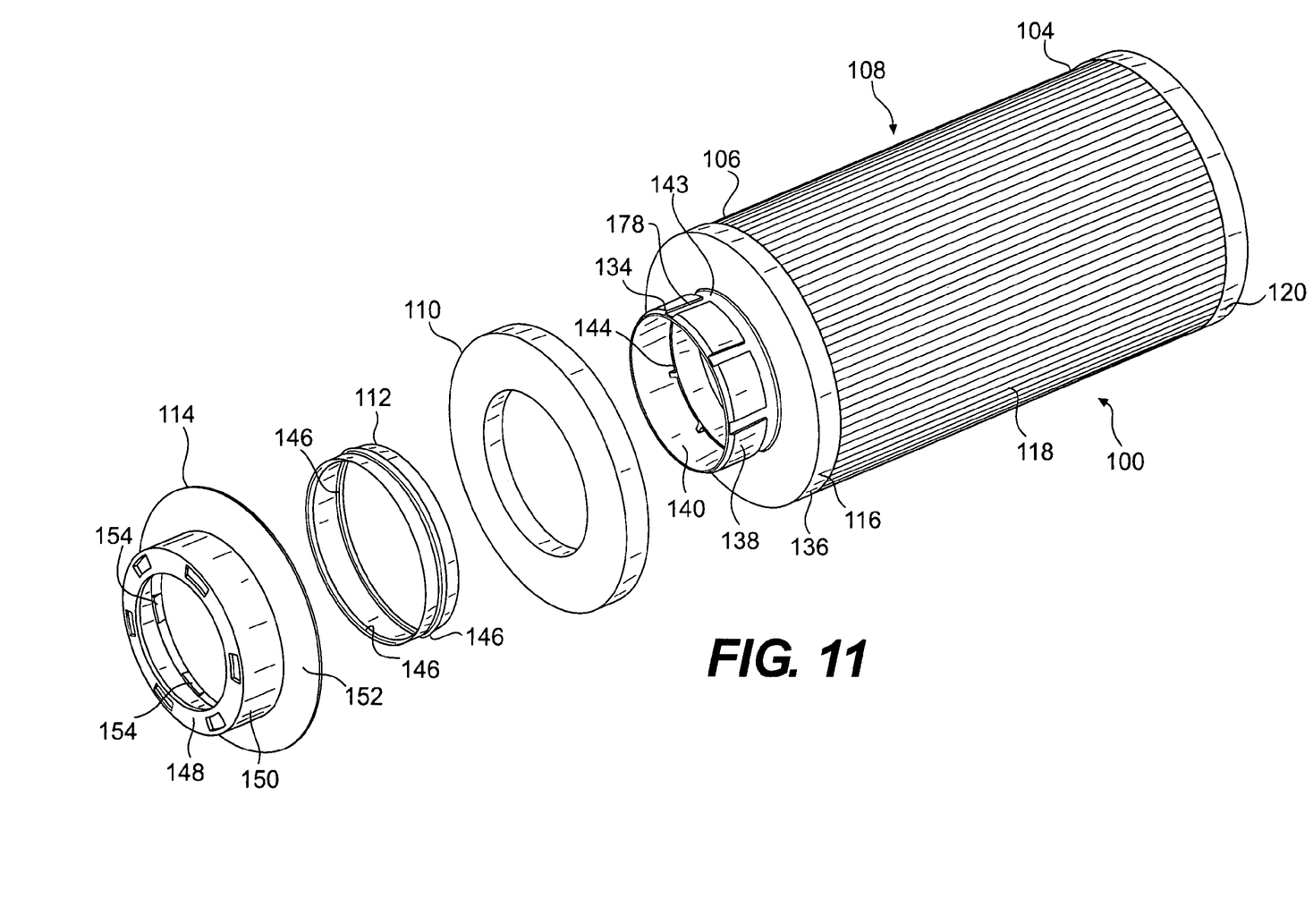
FIG. 11 is an exploded view showing another embodiment of a fluid filter.
Figure 12:
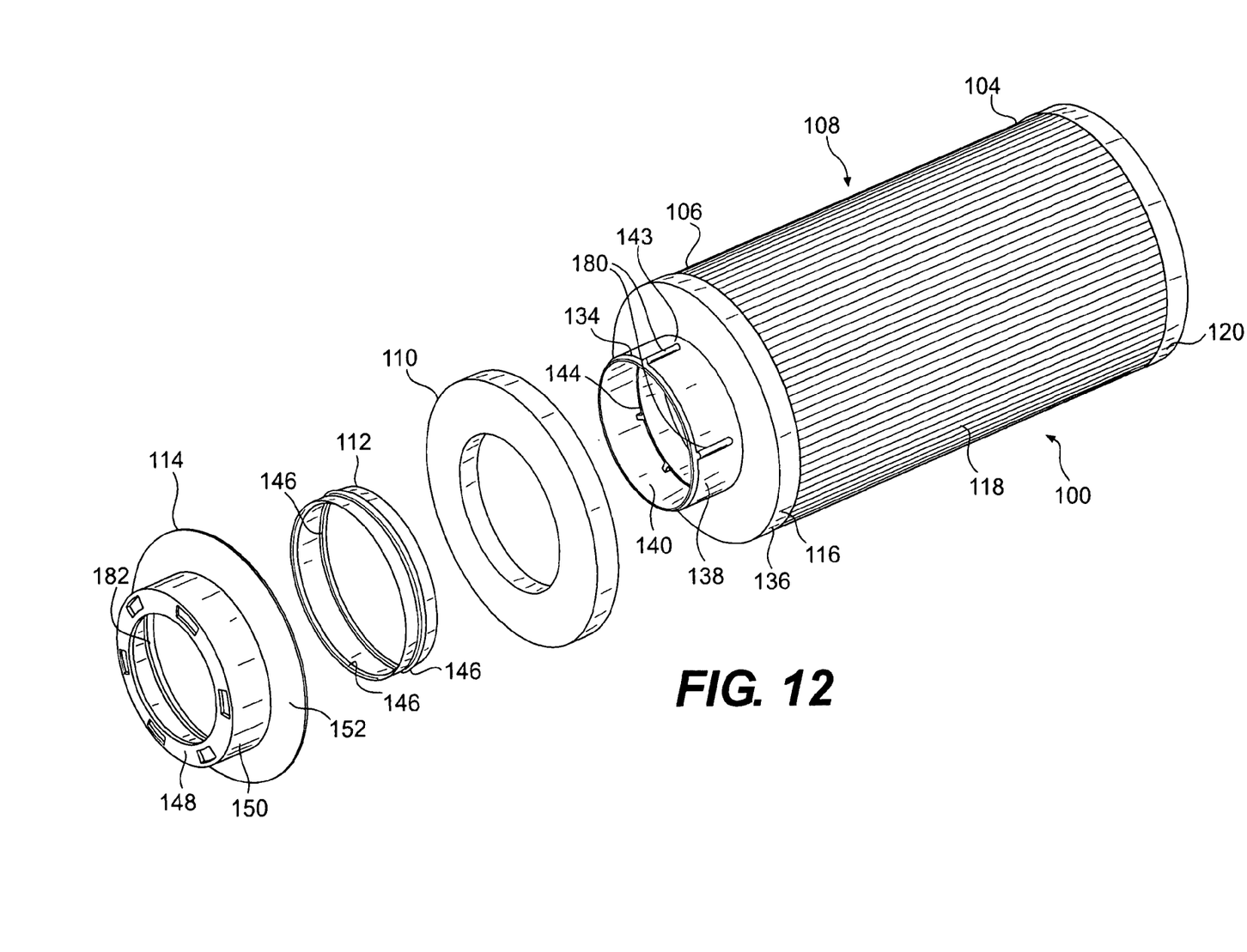
FIG. 12 is an exploded view showing another embodiment of a fluid filter.

Turning to FIGS. 2, 5, and 6, the lower end cap 116 is generally cylindrical and comprises a retainer engagement portion 134, and a filter receiving portion 136 that extends radially outward from the retainer engagement portion 134. The retainer engagement portion 134 comprises an outer surface 138 and an inner surface 140. The outer surface 138 has a receiving rim 142 for attachment to the retainer 114. The receiving rim 142 has a diameter that is greater than the diameter of the groove 143 of the retainer engagement portion 134. In other embodiments, such as shown in FIG. 10, the end cap 116 may have one or more grooves, such as grooves 143, 145, and 147, to engage the one or more barbs 154 of the retainer 114. By way of example and not limitation, it will be appreciated that the end cap may comprise one, two, three, four, five or more grooves. FIG. 11 shows another embodiment of the lower end cap 116 wherein the retainer engagement portion 134 comprises one or more vertically disposed grooves 178 disposed substantially perpendicular to the groove 143. In other embodiments, such as shown in FIG. 12, the lower end cap 116 may comprise a retainer engagement portion 134 having one or more vertically disposed ridges suitable for receiving and securing a retainer 114. The filter receiving portion 136 is adapted to be coupled to the filter portion 118.

The ring 110 as seen in FIG. 2 is substantially ring-shaped and has an inner diameter of sufficient size such that the ring 110 may fit around the retainer engagement portion 134 of the lower end cap 116. The outer diameter of the ring 110 is larger than the outer diameter of the filter receiving portion 136 of the lower end cap 116 such that the ring 110 extends radially outward beyond the lower end cap 116.

Figure 13:
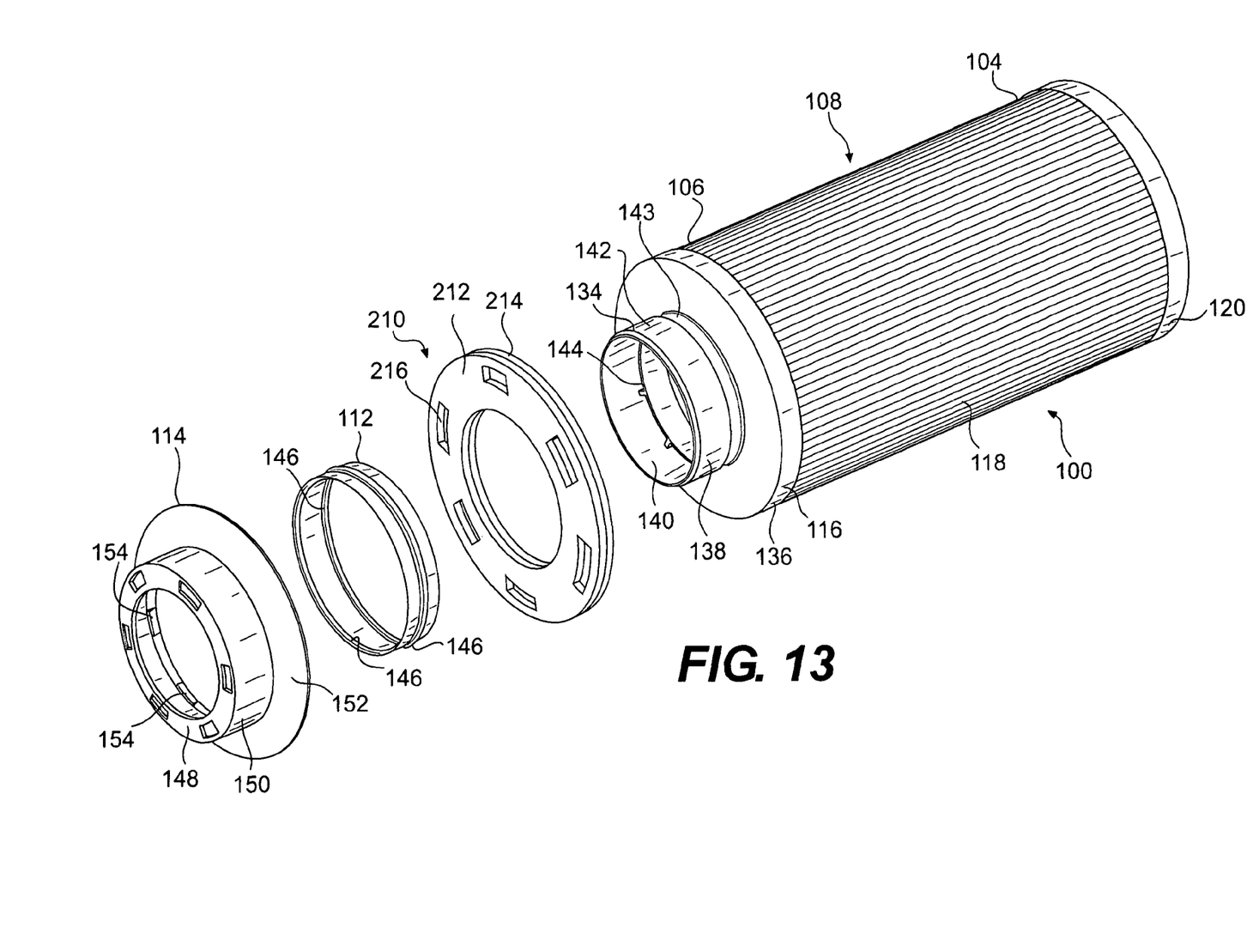
FIG. 13 is an exploded view showing another embodiment of a fluid filter.
Figure 14:
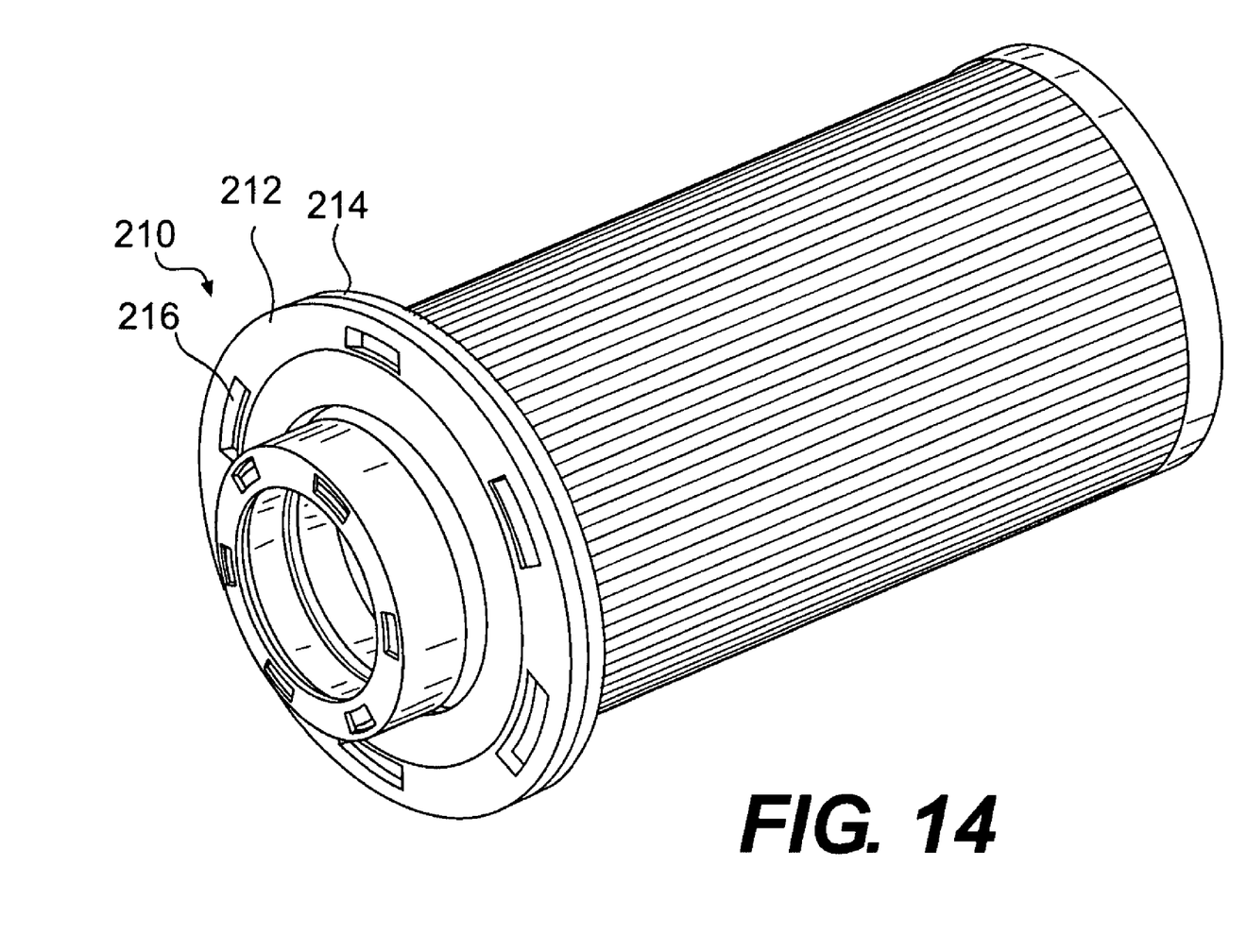
FIG. 14 is a perspective view showing the fluid filter of FIG. 13.

In another embodiment, as shown in FIGS. 13 and 14, the ring 210 may comprise one or more windows 216. The windows 216 may have a screen or other permeable filter material/structure disposed within or behind the windows 216 to act as a filter or sieve. Alternately, the windows 216 may be open to permit the passage of fluid through the windows 216. In further embodiments, the ring 210 may comprise one or more layers 212, 214 to provide support for the ring 210 and/or provide additional filtration. Additional support for the ring may be desirable to prevent the ring from deforming as the filter is replaced, thus providing a durable structure for scraping contaminants from a housing chamber 158 (described in further detail below). Furthermore, the layer 214 may comprise a permeable filter material to restrict or prevent the flow of contaminants through the windows. The one or more layers 212, 214 may be disposed adjacent to one another and may be adhered or otherwise retained to one another. It will be appreciated that any suitable number of windows of any suitable shape or size may be used. It will further be appreciated that the ring 210 may have any suitable number of layers arranged in any suitable orientation. For example, the orientation of the layers 212, 214 may be reversed such that the layer 212 is closer to the lower end cap 116 than the layer 214.

The ring may be constructed of a permeable material, an impermeable material, or a combination thereof. The ring may also be constructed of a compressible material, such as a sponge or foam like material that may be compressed and may be capable of substantially returning to its original shape when a compression force is removed. The ring may be constructed of any suitable material, including but not limited to, thermally reticulated polyester urethane foam, elastomers, plastics, spun bonded sieves, normal filtering materials, or any combination thereof.

Turning back to FIGS. 2, 5, and 6, the gasket 112 is ring shaped and may be disposed within the retainer engagement portion 134 of the lower end cap 116. The lower end cap 116 may comprise a platform 144 to prevent the gasket 112 from entering the interior of the filter portion 118. The gasket 112 provides a seal between filtered and unfiltered fluid as the fluid exits the filter 100. The gasket 112 may comprise one or more ribs 146 on the inner and/or outer surface of the gasket 112. The gasket 112 may be constructed of a rubber or other suitable material sufficient to prevent contamination of filtered fluid with unfiltered fluid and substantially resist filtered fluid from seeping out of the retainer engagement portion 134.

The retainer 114 comprises a gasket retaining flange 148, an intermediate body 150, and a radially extending skirt 152, which can be seen in FIGS. 2, 5, and 6. The gasket retaining flange 148 extends inward a sufficient distance from the intermediate body 150 to retain the gasket 112 in place. The intermediate body 150 comprises one or more barbs 154 suitable for gripping the retainer engagement portion 134 to securely couple the retainer 114 to the lower end cap 116. In one embodiment, the retainer 114 may include six barbs. In other embodiments, the retainer may include one, two, three, four, five, or more barbs. In further embodiments such as shown in FIG. 12, the retainer 114 may comprise a continuous barb 182 along an inner surface of the retainer 114. As most clearly shown in FIGS. 2 and 6, the barbs 154 flare radially inward from the inner surface of the intermediate body 150 such that they may fit over and grip the receiving rim 142 of the lower end cap 116 to retain the retainer 114 to the lower end cap 116. It will be appreciated, however, that any suitable structure may be used to couple the retainer 114 to the lower end cap 116.

As may be viewed in FIGS. 2, 5, and 6, the radially extending skirt 152 extends radially outward from the intermediate body 150 to support the bottom of the ring 110 and trap the ring 110 such that the ring 110 is securely disposed against the lower end cap 116. When assembled, the radially extending skirt 152 may compress the ring 110 against the filter receiving portion 136 on the opposite side of the filtering material 118 of the lower end cap 116.

Having the ring 110 retained against the lower end cap 116 via the retainer 114 avoids the necessity of an adhesive to secure the ring 110 to the filter 100. In this way, the cost of the filter 100 may be reduced because the adhesive need not be applied, and the process for applying an adhesive is unnecessary. Furthermore, potential leakage from a non-uniformly applied adhesive or an adhesive failure is avoided. Thus, a less expensive and more effective seal is created.

Figure 7:
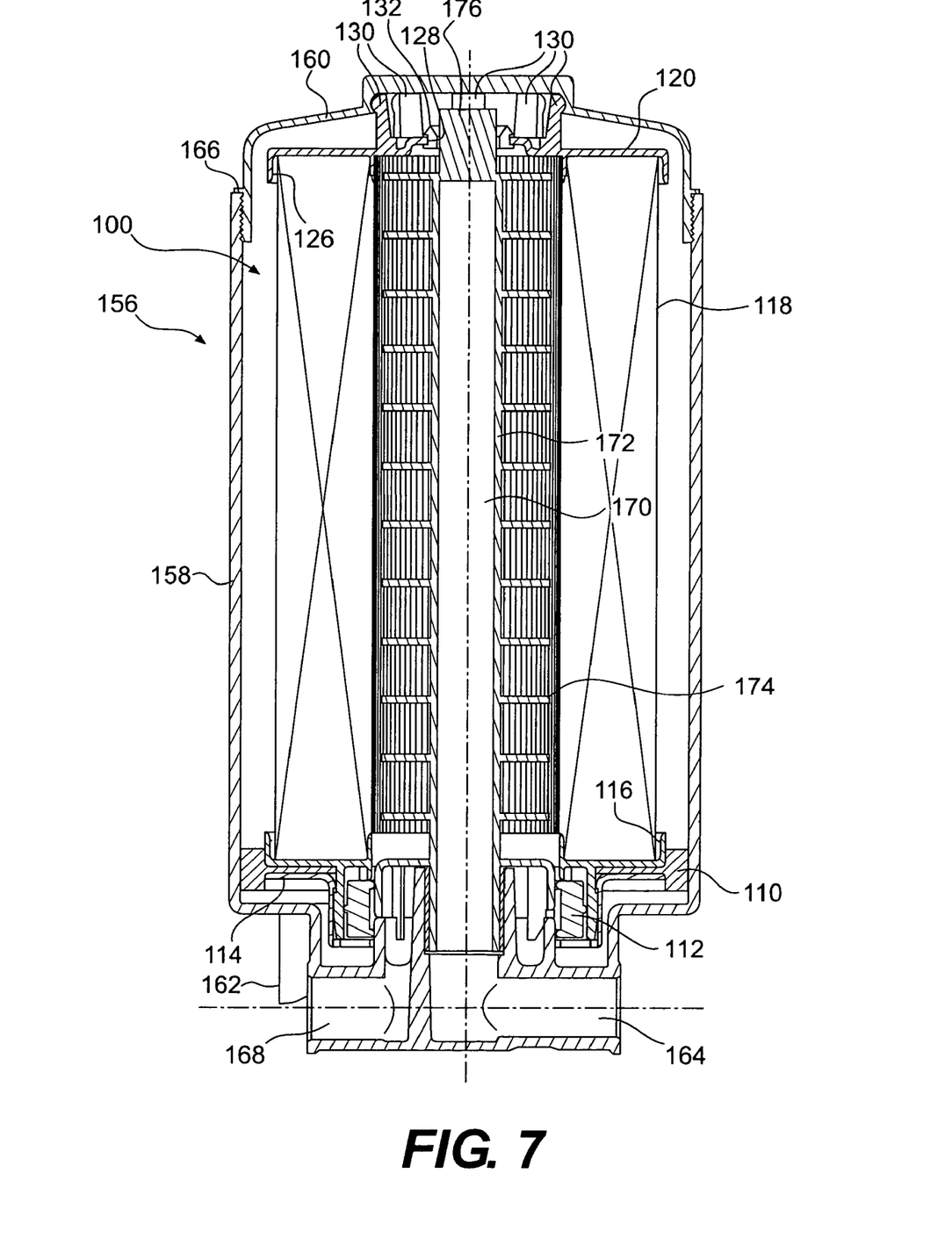
FIG. 7 is a cross-sectional view of the fluid filter of FIG. 1 disposed within a housing.
Figure 8:
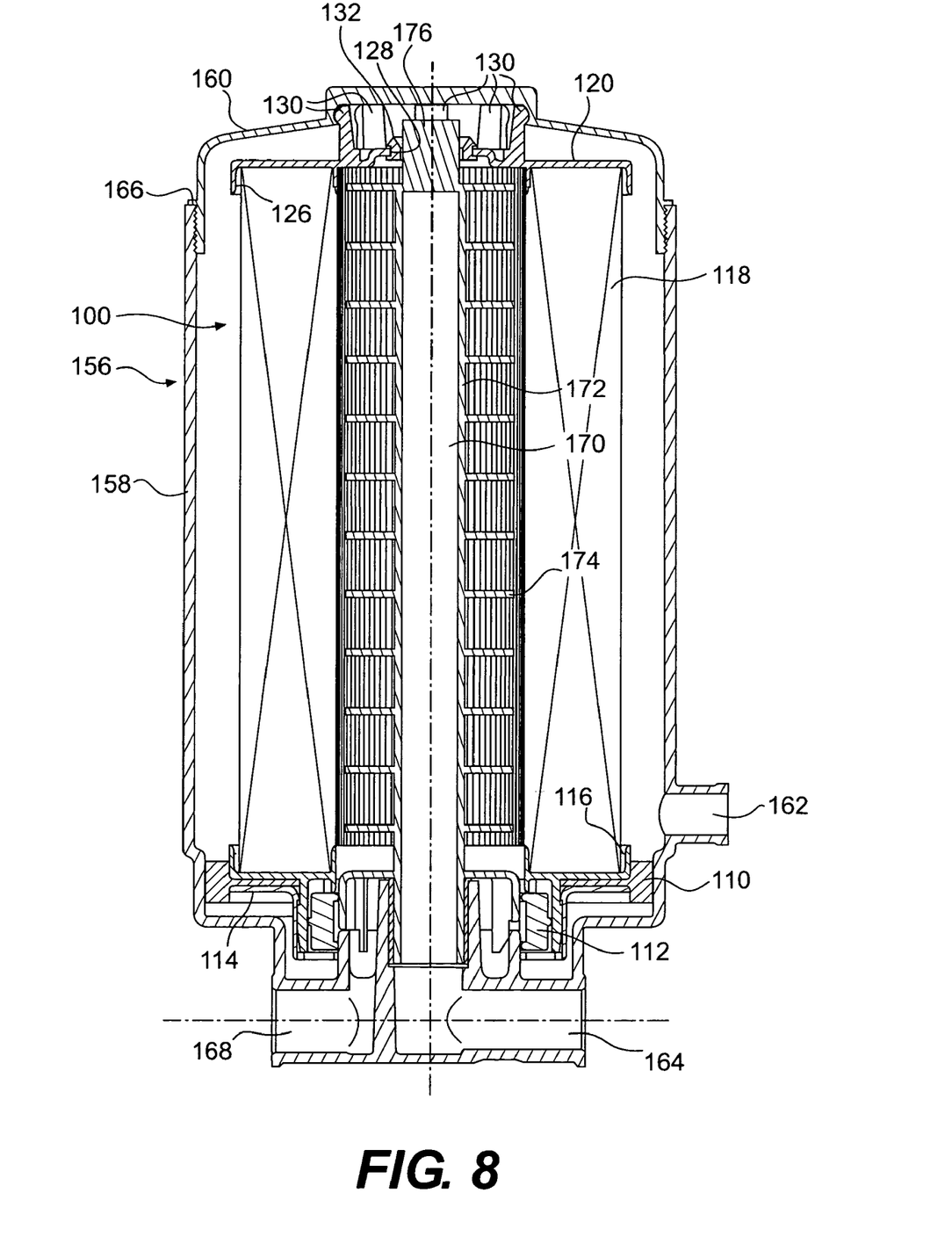
FIG. 8 is a cross-sectional view of the fluid filter of FIG. 1 disposed within another embodiment of a housing.
Figure 9:
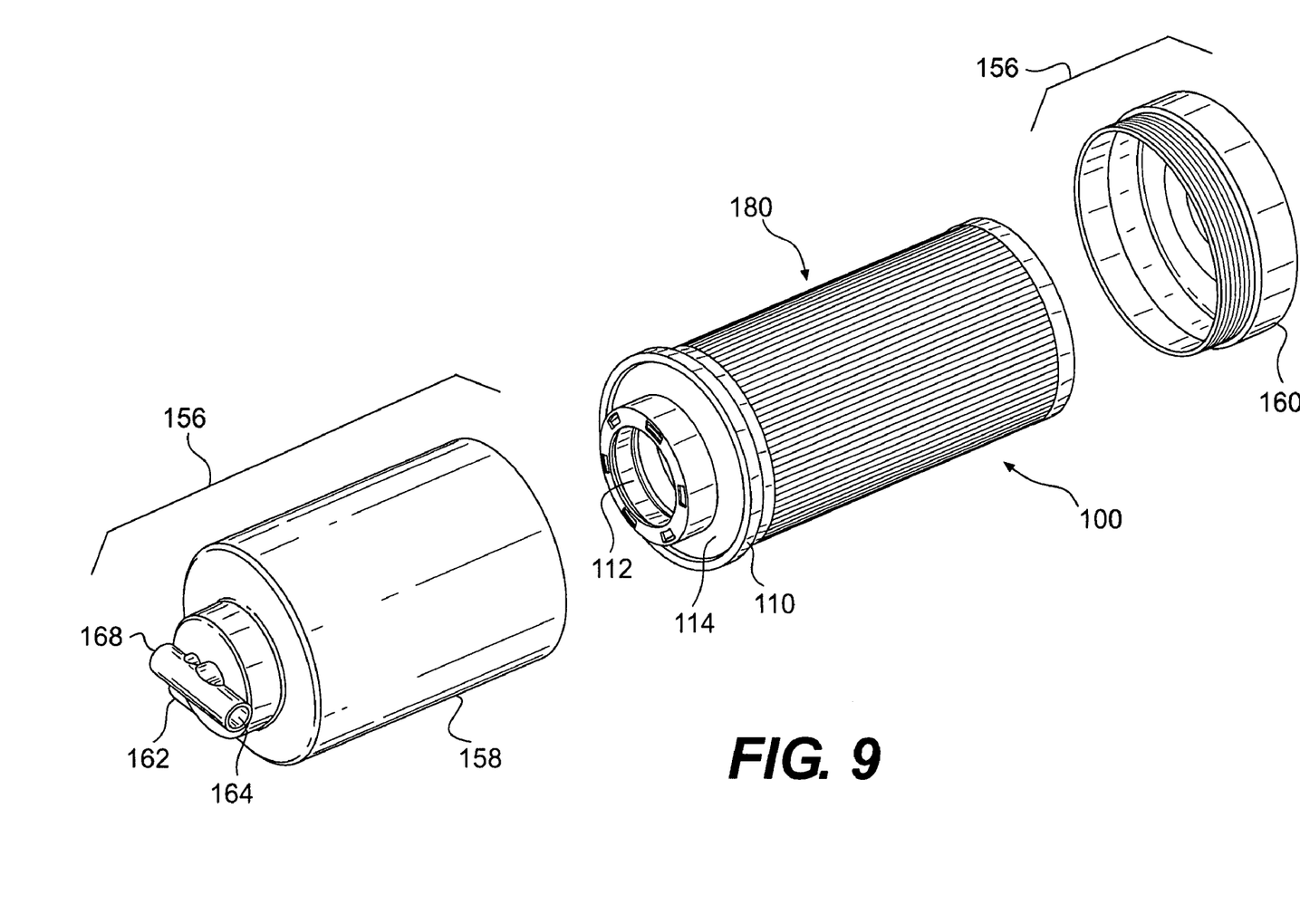
FIG. 9 is an exploded view of the fluid filter of FIG. 1 with the housing shown in FIG. 7.

Turning to FIGS. 7, 8, and 9, the filter 100 may be disposed within a housing 156. The housing 156 generally comprises a housing chamber 158 and a housing cap 160. The housing may also comprise a filter support structure 170 (shown in FIGS. 7 and 8 and described in further detail below). As shown in FIG. 7, the housing chamber 158 comprises a fluid input 162, a fluid output 164, and an open mouth 166. The fluid input 162 receives unfiltered fluid for passage into the chamber 158. The fluid output 164 permits filtered fluid to exit the chamber 158. The housing cap 160 is adapted to securely close the open mouth 166 of the housing 156. The housing cap 160 may attach to the housing 156 in any suitable manner, although typically the housing cap 160 will screw onto the open mouth 166 of the housing 156 such that the housing cap 160 can be securely retained over the open mouth 166 to resist any pressure built up inside the housing 156. When the housing cap 160 is attached, it may engage the prongs 130 to secure the housing cap 160 to the filter 100. The filter 100 is disposed within the housing 100 such that as fluid enters the housing 100 through the input 162, the fluid is forced through the filter portion 118. The filter portion 118 permits the passage of the fluid through the filter 100 while preventing the flow of contaminants of a certain size through the filter 100. After the fluid has passed through the filter 100, the filtered fluid exits the housing 156 through the output 164. Although the filter 100 may typically be mounted upright in the housing 156, it will be appreciated that the housing 156 may be oriented in any suitable manner such that the filter 100 may be disposed within to filter a fluid passing therethrough.

The housing chamber 158 may additionally comprise a drainage output 168. The drainage output 168 may be disposed to receive any fluid remaining in the housing 156 when the filter 100 is changed. Thus, the drainage output 168 may help prevent contaminated fluid from overflowing into the fluid output 164. The drainage output 168 will typically lead back to the fuel tank or oil pan such that any fluid that exits through the drainage output 168 must be reintroduced through the input 162 and filtered before reaching the fluid output 164.

During the operation of the filter 100, as contaminants build up on the exterior of the filter portion 118, many of the contaminants will have a tendency to be pulled by gravity and/or incoming fluid toward the lower end of the housing 156. When installed, as shown in FIG. 7, the ring 110 of the filter 100 fits securely against the chamber 158 of the housing 156 such that any contaminants that fall to the lower end of the housing 156 are trapped above the ring 110. Furthermore, as the filter 100 is removed from the housing 156, the ring 110 may remove contaminants from the sidewall of the chamber 158 as the filter 100 is lifted through the open mouth 166 for replacement. Thus, potential contaminants along the sidewall of the chamber 158 may be removed from the housing 156 rather than being permitted to seep into the drainage output 168 and recirculate to be filtered by a new replacement filter 100.

In other embodiments of the housing 156, such as shown in FIG. 8, the chamber 158 of the housing 156 may have a diameter that is smaller near where the ring 110 will abut the chamber 158, and the chamber 158 may have a larger diameter encircling the body of the filter 100. A housing 156 of this type permits more room between the chamber wall and the filter 100 such that a greater amount of unfiltered fluid may be contain in the housing 156, while maintaining the seal created by the ring 110 disposed against the chamber wall.

FIGS. 7 and 8 show a filter support structure 170 disposed within the housing 156. The filter support structure 170 may comprise a body 172, one or more discs 174 extending radially outward from the body 172, and a filter engagement portion 176. The filter support structure 170 is of a sufficient size such that at least a portion of the filter support structure 170 may fit within the aperture 102 of the filter 100. The filter support structure 170 is disposed within the housing 156 such that as the filter 100 is inserted into the housing 156 and the filter support structure 170 is fitted within the aperture 102, the filter 100 is substantially disposed in the proper filtering orientation within the housing 156. Furthermore, the discs 174 provide support to the interior of the filter 100 to resist a potential collapsing force experienced by, for example, a pressure differential between the exterior and the interior of the filter 100 and/or the force of fluid being drawn through the filter portion 118. The filter engagement portion 176 extends from the filter support structure 170 to engage the aperture 128 in the upper end cap 120 to center the filter 100 relative to the filter support structure 170. The seal 132 prevents the flow of liquid between the filter engagement portion and the aperture 128 in the upper end cap 120 to prevent contamination of filtered fluid with unfiltered fluid. It will be appreciated that the filter support structure 170 may be a component of the housing 156 or the filter 100. Thus, the filter support structure 170 may be coupled to or formed as part of the housing 156. Alternately, the filter support structure 170 may be coupled to or formed as part of the filter 100.

By way of example and not limitation, a filter 100 comprising a ring 110 retained without the use of an adhesive may be constructed by attaching a filter portion 118 to a lower end cap 116 and an upper end cap 120 to form a filter body 108. A gasket 112 may be disposed within the lower end cap 116 near a platform 144. A ring 110 may be disposed adjacent to the lower end cap 116 such that the ring 110 may encircle a retainer engagement portion 134. A retainer 114 may then be disposed over the retainer engagement portion 134 to trap the ring 110 at least partially between the retainer 114 and the lower end cap 116. Thus, a filter 100 may be constructed having a ring 110 without the expense associated with purchasing or applying an adhesive to adhere the ring 110. Additionally, having the ring 110 trapped rather than adhered provides a more reliable and durable seal along the interior surface of a housing chamber.

A filter for separating contaminants, such as solid particles, from a liquid and a method for making such a filter have been disclosed herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A fluid filter for separating contaminants from a liquid, the fluid filter comprising:
    a cylindrical body, the cylindrical body comprising an aperture disposed therethrough, a filter material for filtering the contaminants from the liquid, and an end cap portion;
    a retainer coupled to the end cap portion, the retainer includes at least one barb for coupling the retainer to the end cap portion; and
    a ring disposed at least partially between the end cap portion and the retainer, the ring has an outer circumference greater than an outer circumference of the end cap portion.

2. The fluid filter of claim 1 further comprising a gasket.

3. The fluid filter of claim 2 wherein the retainer retains the gasket adjacent to the end cap portion.

4. The fluid filter of claim 1 wherein the retainer comprises a radially extending skirt disposed adjacent to the ring.

5. The fluid filter of claim 1 further comprising a filter support structure.

6. The fluid filter of claim 1 wherein the end cap portion further comprises at least one groove for receiving the at least one barb.

7. The fluid filter of claim 1 wherein the end cap portion further comprises at least one ridge for engaging the at least one barb.

8. The fluid filter of claim 1 wherein the ring comprises a material which is permeable to fluids.

9. The fluid filter of claim 1 wherein the ring comprises a material which is non-permeable to fluids.

10. The fluid filter of claim 1 wherein the ring comprises a first material which is permeable to fluids and a second material which is non-permeable to fluids.

11. The fluid filter of claim 1 wherein the ring comprises a material which may be compressed and substantially returns to its original shape when a compression force is removed.

12. The fluid filter of claim 1 wherein the ring comprises a window.

13. The fluid filter of claim 1 wherein the ring comprises a plurality of layers.

14. The fluid filter of claim 1 wherein the cylindrical body comprises a second end cap portion.

15. The fluid filter of claim 1 wherein the fluid filter is adapted to be disposed within a housing having an inner surface such that the ring provides a seal adjacent to the inner surface of the housing.

16. The fluid filter of claim 15 wherein the housing comprises a housing cap and the fluid filter comprises an attachment portion for coupling the fluid filter to the housing cap.

17. The fluid filter of claim 1 wherein the filter material comprises a plurality of pleats.

18. A fluid filter assembly for separating contaminants from a liquid comprising a fluid filter and a housing having an inner surface, the fluid filter comprising:
    a cylindrical body, the cylindrical body comprising an aperture disposed therethrough and a filter material for separating the contaminants from the liquid; and
    a ring for disposal against the inner surface and coupled to the cylindrical body without the use of an adhesive, the ring comprises a first material which is permeable to fluids and a second material which is non-permeable to fluids.

19. The fluid filter of claim 18 wherein the body includes an end cap portion.

20. The fluid filter of claim 18 further comprising a retainer disposed against the ring such that the ring is disposed at least partially between the cylindrical body and the retainer.

21. The fluid filter of claim 18 wherein the ring comprises a material which may be compressed and substantially returns to its original shape when a compression force is removed.

22. The fluid filter of claim 18 wherein the ring comprises a window.

23. The fluid filter of claim 18 wherein the ring comprises a plurality of layers.

24. The fluid filter of claim 18 further comprising a gasket.

25. The fluid filter of claim 19 further comprising a gasket and a retainer, the retainer retains the gasket adjacent to the end cap portion.

26. The fluid filter of claim 20 wherein the retainer comprises a radially extending skirt disposed adjacent to the ring.

27. The fluid filter of claim 18 wherein the filter material comprises a plurality of pleats.

28. The fluid filter of claim 18 wherein the cylindrical body comprises a second end cap portion.

29. The fluid filter of claim 18 further comprising a filter support structure.

* * * * *